United States Patent
Vaswani et al.

[11] Patent Number: 5,835,097
[45] Date of Patent: Nov. 10, 1998

[54] NON-HOMOGENOUS SECOND ORDER PERSPECTIVE TEXTURE MAPPING USING LINEAR INTERPOLATION PARAMETERS

[75] Inventors: Gautam P. Vaswani; Michael Larson; Tom Dye, all of Austin, Tex.

[73] Assignee: Cirrus Logic, Inc., Fremont, Calif.

[21] Appl. No.: 774,787

[22] Filed: Dec. 30, 1996

[51] Int. Cl.⁶ .................................................. G06F 15/00
[52] U.S. Cl. ......................................................... 345/430
[58] Field of Search .................................. 345/430, 429, 345/117, 118, 121

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,745,667 | 4/1998 | Kawase et al. | 345/430 |
| 5,751,293 | 5/1998 | Hashimoto et al. | 345/430 |

FOREIGN PATENT DOCUMENTS

WO 96/36011  11/1996  WIPO .

*Primary Examiner*—Phu K. Nguyen
*Attorney, Agent, or Firm*—Wagner, Murabito & Hao; Steven A. Shaw

[57] ABSTRACT

In a computer system having a host processor, a peripheral graphics device, a display screen, and a memory, a non-homogenous second order perspective texture mapping process. Polygon coordinates, $a_{m,n}$, defining a texture polygon, are received. Initial values are received for a set of parameters including $u_{main}$, $v_{main}$, $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho-ADD}$, and $dv_{ortho-ADD}$. The texture polygon includes span regions. A span value, j, is set to an initial value to designate an initial span region of the texture polygon in (m, n) polygon coordinate space. The total number of rows, $n_{max}$, is determined for the current span region of the polygon. The total number of polygon coordinates, $m_{max}$, in the current row, n, of the texture polygon is determined. An (x, y) display coordinate, corresponding to the current polygon coordinate, $a_{m,n}$, is set by translating from (m, n) polygon space to (x, y) display coordinate space. Texture coordinates, $u(a_{m,n})$ and $v(a_{m,n})$, are determined, according to the present invention, for each polygon coordinate, $a_{m,n}$, using linear interpolation based on a set of relationships that utilize the above parameters without using a repetitive divide operation. A display pixel of a color determined according to texture coordinates, $u(a_{m,n})$ and $v(a_{m,n})$, is rendered on a display screen at the determined (x, y) position.

13 Claims, 6 Drawing Sheets

NON-HOMOGENOUS SECOND ORDER PERSPECTIVE TEXTURE MAPPING USING LINEAR INTERPOLATION PARAMETERS

FIELD OF THE INVENTION

The present invention relates to the field of computer implemented graphics display. Specifically, the present invention relates to a system and method for second order perspective texture mapping.

BACKGROUND OF THE INVENTION

Computer controlled graphics systems are used for displaying graphics objects on a display. These graphics objects are composed of graphics primitive elements ("graphics primitives") that include points, lines, polygons, etc. The graphics primitives can be used to render a 2 dimensional (2-D) image of a three dimensional (3-D) object on a display screen. Texture mapping refers to techniques for adding surface detail to areas or surfaces of these 3-D graphics objects displayed on a 2-D display. Since the original graphics object is 3-D, texture mapping often involves maintaining certain perspective attributes with respect to the surface detailed added to the object. Generally, texture mapping occurs by accessing encoded surface detail points or "texels" from a memory storing the surface detail and transferring the surface detail texels to predetermined points of the graphics primitive to be texture mapped. The manner in which the texels are accessed is used to provide the perspective discussed above.

Figure 1A:
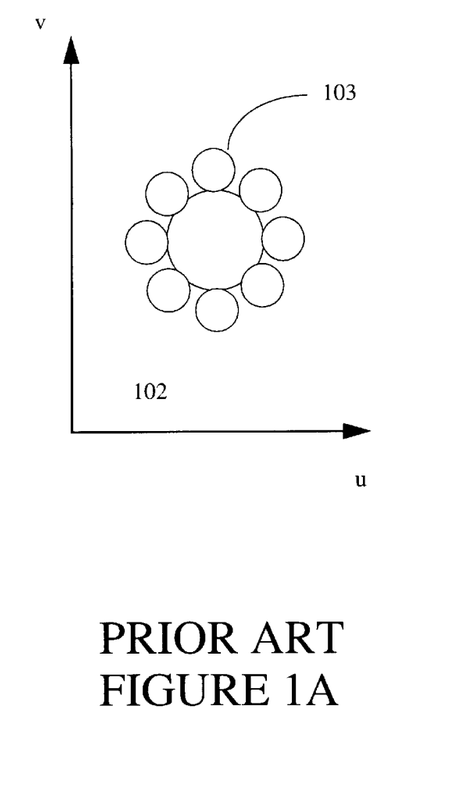
FIG. 1A represents a texture map.
Figure 1B:
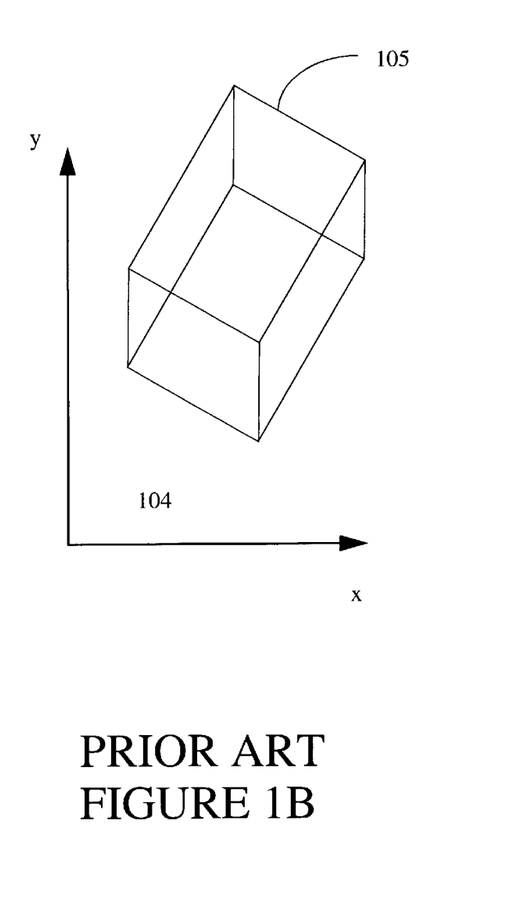
FIG. 1B represents a display screen.

With reference to prior art FIGS. 1A and 1B, a texture map 102 and a display screen 104 are shown. The texture map 102 contains a texture image 103 to be mapped onto an area or surface of a graphics object 105 on the display screen 4. The texture map 102 includes point elements (texels) which reside in a (u, v) texture coordinate space. The texture image 103 is represented in computer memory as a bitmap or other raster-based encoded format. The display screen 104 includes point elements (pixels) which reside in an (x, y) display coordinate space. More specifically, texture mapping operates by applying color or visual attributes of texels of the (u, v) texture map 102 to corresponding pixels of the graphics object 105 on the display screen 104. In texture mapping, color values for pixels in (x, y) display coordinate space are determined based on sampled texture map values. After texture mapping, a version of the texture image 103 is visible on surfaces of the object 5.

Three types of texture mapping are described below, linear, second order homogeneous perspective and second order non-homogeneous perspective. In linear texture mapping, texels of a texture map are generally mapped onto pixels of a 2-D or 3-D graphics object linearly whereby the rate of sampling in texel space with respect to the screen coordinate update rate is constant, e.g., du/dx and du/dy are constant values. In perspective texture mapping, texels of a texture map are generally mapped onto pixels of a 3-D graphics object that is displayed in 2-D space (x, y) wherein the rate of sampling in texel space with respect to the rate of screen coordinate update rate is not constant. Perspective texture mapping features an illusion of depth which is created by varying the sampling rate of the texture map 102 during the normal linearly performed polygon rendering process on the display screen 104. With reference to prior art FIG. 1A and FIG. 1B, the texture image 103 is mapped onto surfaces of a 2-D rendition of the 3-D graphics object 105 on the display screen 104.

Figure 2A:
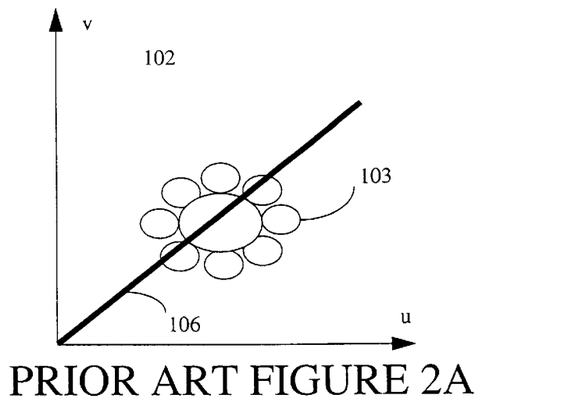
FIG. 2A is a prior art linear sampling path for sampling a texture map.

With reference to prior art FIG. 2A, a linear texture sampling path 106 is shown in the (u, v) texture coordinate space that is traversed (e.g., "sampled") during texture map sampling. During linear texture map sampling, the texture image 103 is sampled according to path 106 simultaneously with a well known linear polygon rendering process. Path 106 can be represented by a linear equation of u and v. Each texel of the texture map 102 is defined according to (u, v) coordinates. The rates of change of u and v with respect to x and y (e.g., du/dx, du/dy, dv/dx, and dv/dy) of the linear sampling path 106 of FIG. 2A, are constant values for linear texture map sampling.

Figure 2B:
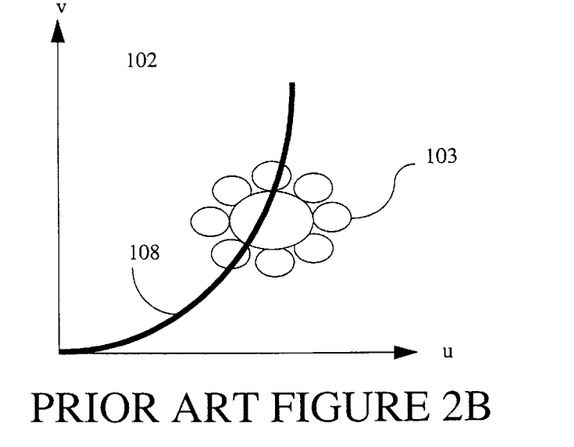
FIG. 2B is a prior art homogenous 2nd order perspective sampling path for sampling a texture map.

With reference to FIG. 2B, a second order homogeneous perspective texture sampling path 108 is shown in (u, v) texture coordinate space. The rates of change of u and v with respect to x and y (e.g., du/dx, du/dy, dv/dx, and dv/dy) of the second order homogeneous perspective sampling path 8 are varying values. However, the rates of change of the rates of change of u and v with respect to x and y (e.g., $d^2u/dx^2$, $d^2u/dy^2$, $d^2v/dx^2$, and $d^2v/dy^2$) of the second order homogenous perspective sampling path 8 are constant and thus homogenous values. During homogenous second order texture map sampling, the texture map 102 is sampled according to path 108 during the polygon rendering process. Path 108 can be represented by a homogenous second order polynomial equation of u and v.

Figure 2C:
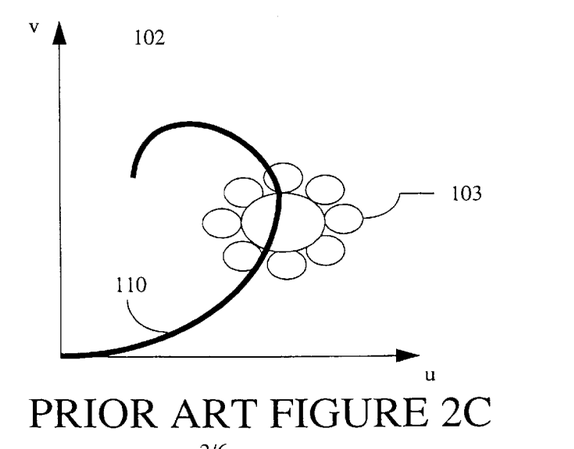
FIG. 2C is a prior art non-homogenous 2nd order perspective sampling path for sampling a texture map.

With reference to Prior Art FIG. 2C, a non-homogenous second order perspective sampling path 110 is shown in (u, v) texture coordinate space. The rates of change of u and v with respect to x and y (e.g., du/dx, du/dy, dv/dx, and dv/dy) along sampling path 110 are varying values. The rates of change of the rates of change of u and v with respect to x and y (e.g., $d^2u/dx^2$, $d^2u/dy^2$, $d^2v/dx^2$, and $d^2v/dy^2$) of the second order perspective sampling path 110 are also varying values and non-homogenous (e.g., the second order rate of change of u is defined by multiple functions of v). During non-homogenous second order texture map sampling, the texture map 102 is sampled according to path 110 during the polygon rendering process. Path 110 can be represented by a non-homogenous second order non-homogenous polynomial equation of u and v.

In typical prior art second order perspective texture mapping techniques, linear terms are generated and divided by perspective terms to obtain perspective texture map sample coordinates, T(u, v), for a given display coordinate in (x, y) display coordinate space. The coordinates (u, v) can then be used to obtain an attribute value from a texture map, T, according to T(u, v). The relationship below illustrates an exemplary second order perspective texture mapping relationship in which linear terms, Du and Dv, are divided by perspective terms, W(x, y, z), which represent depth, to obtain perspective texture map sample position rates of change, du and dv, $$(du, dv) = (du/W(x, y, z), dv/W(x, y, z)).$$

From du and dv, the texture coordinates (u, v) are computed in the prior art.

A problem associated with the above described prior art second order perspective texture mapping technique is that it is costly to implement in terms of processor time and integrated circuit real estate due to the repetitive divide operation. Divide operations are computationally expensive. Thus a need exists for a second order perspective texture mapping apparatus which is not costly to implement in terms of processor time and integrated circuit real estate. What is needed further is an apparatus for second order perspective texture mapping that eliminates the repetitive division operation required by prior art texture mapping techniques.

Accordingly, the present invention provides such advantages. These and other advantages of the present invention not described above will become clear in view of the following detailed description of the present invention.

BRIEF DESCRIPTION OF THE DRAWINGS

Prior Art

Prior Art

Prior Art

Prior Art

Prior Art

SUMMARY OF THE INVENTION

The process of the present invention provides an approximation for non-homogenous 2nd order perspective texture mapping to provide texture for a polygon which does not require a division operation during polygon rendering. Color values for pixels in (x, y) display coordinate space are determined based on texture map values generated by sampling and processing according to a non-homogenous 2nd order perspective texture mapping process of the present invention.

Polygon coordinates, $a_{m,n}$, defining a texture polygon residing in (m, n) polygon coordinate space, are received. Each polygon coordinate, $a_{m,n}$, is associated with a position in (m, n) polygon coordinate space. The subscript, m, of each polygon coordinate, $a_{m,n}$, refers to the orthogonal position and the subscript, n, of each polygon coordinate, $a_{m,n}$, refers to the vertical or main position of the polygon coordinate in (m, n) polygon coordinate space.

The non-homogenous 2nd order perspective texture mapping process of the present invention determines texture coordinates, $u(a_{m,n})$ and $v(a_{m,n})$, for each of the polygon coordinates, am, n. Texture coordinates, $u(a_{m,n})$ and $v(a_{m,n})$, are used as indexes into a texture map to determine colors or visual attributes of display pixels rendered in (x, y) display coordinate space on a display screen. Within the present invention, determining values for texture coordinates, $u(a_{m,n})$ and $v(a_{m,n})$, involves non-homogenous second order perspective texture map sampling of a texture map. The rate of change of u with respect to x, du/dx, is referred to in the present invention as $du_{ortho}$. Similarly, the rate of change of u with respect to y, du/dy, is referred to in the present invention as $du_{main}$. The rate of change of v with respect to x, dv/dx, is referred to as $dv_{ortho}$. The rate of change of v with respect to y, dv/dy, is referred to as $dv_{main}$. The rate of change of the rate of change of u with respect to x, $d^2u/dx^2$, is referred to as $d^2u_{ortho}$. The rate of change of the rate of change of u with respect to y, $d^2u/dy^2$, is referred to as $d^2u_{main}$. The rate of change of the rate of change of v with respect to x, $d^2v/dx^2$, is referred to as $d^2v_{ortho}$. The rate of change of the rate of change of v with respect to y, $d^2v/dy^2$, is referred to as $d^2v_{main}$. In order to compensate for the non-homogenous nature of the mapping (i.e. represent v as a non-uniform second order differential relationship of u), an ortho-add term is included for u and v which approximates for the non-homogenous second order mapping.

In the process of the present invention, values are received for a set of parameters including $u_{main}$, $v_{main}$, $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho-ADD}$, and $dv_{ortho-ADD}$. The initial texture coordinates, $u(a_{0,0})$ and $v(a_{0,0})$, of the polygon to be displayed are set equal to $u_{main}$ and $v_{main}$ respectively. Also, registers for the values of m and n are set to initial values (e.g., m=0 and n=0).

The texture polygon includes an upper half region and a lower half region. A span value, j, is set to an initial value to designate the upper half region of the texture polygon in (m, n) polygon coordinate space to start. The total number of orthogonal rows (or rows), $n_{max}$, is determined for the current half region of the polygon. The total number of polygon coordinates, $a_{m,n}$, in the current row, n, of the texture polygon is determined. An (x, y) display coordinate, corresponding to the current polygon coordinate, $a_{m,n}$, is set by translating from (m, n) polygon space to (x, y) display coordinate space by well known techniques since the polygon's position on the display screen is given.

Texture coordinates, $u(a_{m,n})$ and $v(a_{m,n})$, are determined for the current polygon coordinate, $a_{m,n}$, according to Relationships (2A) and (2B), below:

$$u(a_{m,n})=u(a_{m-1, n})+du_{ortho}(n)+(m-1)d^2u_{ortho} \text{ for } m>0 \quad (2A)$$

$$v(a_{m,n})=v(a_{m-1, n})+dv_{ortho}(n)+(m-1)d^2v_{ortho} \text{ for } m>0; \quad (2B)$$

wherein $d^2u_{ortho(n)}$ and $d^2v_{ortho(n)}$ are constant values and $du_{ortho(n)}$ and $dv_{ortho(n)}$ are determined according to relationships (3A) and (3B), below:

$$du_{ortho(n)}=n(du_{ortho\ ADD})+du_{ortho} \text{ for all n;} \quad (3A)$$

$$dv_{ortho(n)}=n(dv_{ortho\ ADD})+dv_{ortho} \text{ for all n;} \quad (3B)$$

wherein $du_{orthoADD}$ and $dv_{orthoADD}$ are constant values used to approximate for the non-homogenous nature of the second order relationship.

Equations (3A) and (3B) are used to determine values for texture coordinates, $u(a_{m,n})$ and $v(a_{m,n})$, for all polygon coordinate positions other than the first polygon coordinates, $a_{0,n}$, of each row, n, of the texture polygon. Texture coordinates, $u(a_{0,n})$ and $v(a_{0,n})$, for the first polygon coordinate positions, $a_{0,n}$, of each row, n, of the texture polygon are determined according to equations 5A and 5B described further below.

Texture coordinates, $u(a_{m,n})$ and $v(a_{m,n})$, are used to define a color for a display pixel in (x, y) display coordinate space. The color or visual attribute defined by texture coordinates, $u(a_{m,n})$ and $v(a_{m,n})$, is accessed from a texture map and can be expressed by Relationship (4), below:

$$\text{Color}=T(u(a_{m,n}) \text{ and } v(a_{m,n})) \quad (4)$$

where T is the texture map in memory.

Having determined texture coordinates, $u(a_{m,n})$ and $v(a_{m,n})$ for the current polygon coordinate, $a_{m,n}$, a display pixel is rendered on a display screen at the corresponding (x, y) display coordinate position set above. The color of the current display pixel, rendered on the display screen, is determined according to Relationship (4) above.

Subsequently, it is determined whether there are more polygon coordinates, $a_{m,n}$, to be processed for the current row, n, of the texture polygon. If there are no more polygon coordinates, $a_{m,n}$, to be processed for the current row, n, of the texture polygon, then the process of the present invention proceeds to process the next row, n, of polygon coordinates, $a_{m,n}$, of the texture polygon by incrementing the vertical position, n.

Values are then determined for texture coordinates, $u(a_{0,n})$ and $v(a_{0,n})$, for each polygon coordinate, $a_{0,n}$, which is the first polygon coordinate on each row, n, of the texture polygon. Texture coordinates, $u(a_{0,n})$ and $v(a_{0,n})$, are determined for each polygon coordinate, $a_{0,n}$, according to Relationships (5A) and (5B), below:

$$u(a_{0,n}) = u(a_{0,n-1}) + du_{main} + (n-1)d^2u_{main} \text{ for } m=0, n>0 \quad (5A)$$

$$v(a_{0,n}) = v(a_{0,n-1}) + dv_{main} + (n-1)d^2v_{main} \text{ for } m=0, n>0; \quad (5B)$$

wherein $du_{main}$, $d^2u_{main}$, $dv_{main}$, and $d^2v_{main}$ are constants.

Texture coordinates, $u(a_{0,n})$ and $v(a_{0,n})$, are used to define a color for a display pixel in (x, y) display coordinate space. The color or visual attribute defined by texture coordinates, $u(a_{0,n})$ and $v(a_{0,n})$ is accessed from a texture map, T, and can be expressed by Relationship (5), reprinted below;

$$\text{Color} = T[u(a_{m,n}) \text{ and } v(a_{m,n})] \quad (5).$$

Having determined texture coordinates, $u(a_{0,n})$ and $v(a_{0,n})$ for the current polygon coordinate, $a_{0,n}$, a display pixel is rendered on a display screen at the corresponding (x, y) display coordinate position set above. The color of the current display pixel is determined according to Relationship (5) above.

The process of the present invention is implemented as instructions stored in a computer readable memory unit of a host computer system and can be executed over a host processor of the host computer system or over a display processor in a peripheral graphics device of a host computer system.

DESCRIPTION OF THE PREFERRED EMBODIMENTS

In the following detailed description of the present invention, a second order perspective texture mapping process using linear interpolation parameters, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. Herein, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

COMPUTER SYSTEM PLATFORM

Figure 3A:
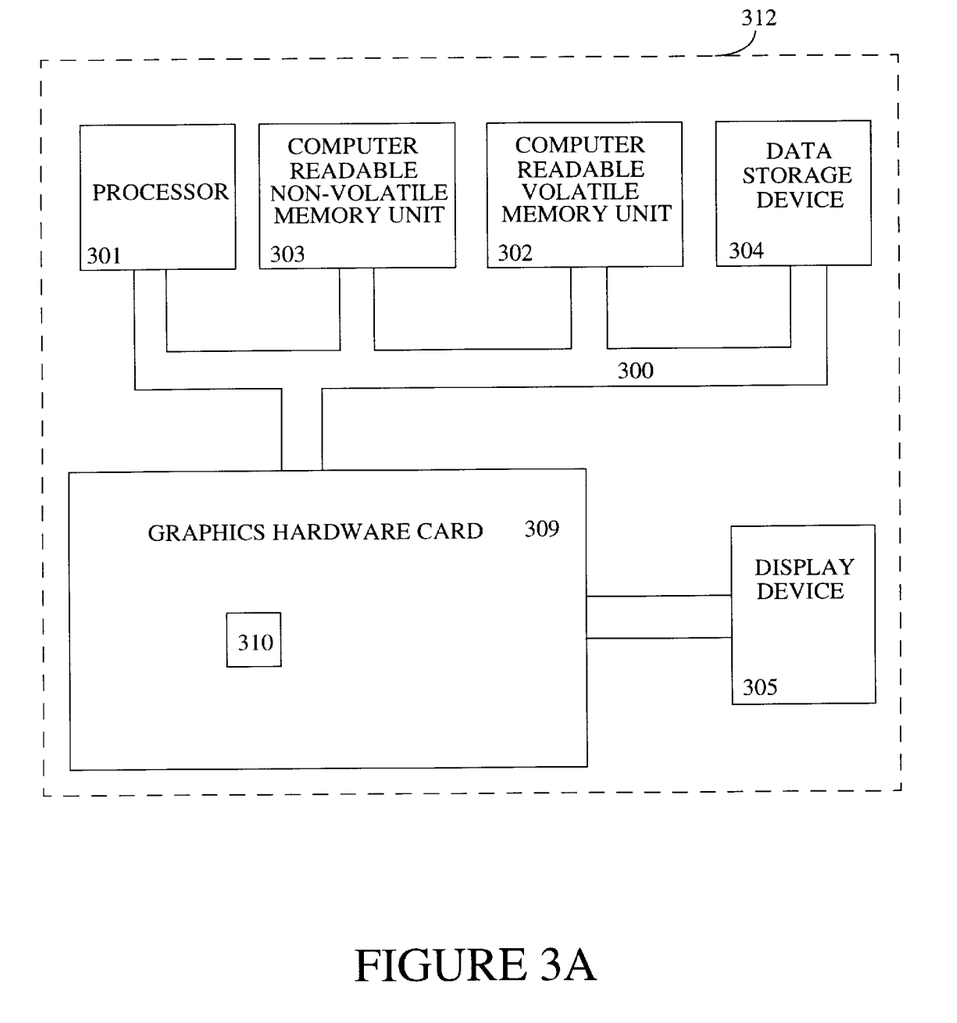
FIG. 3A is an exemplary host computer system for employing the computer implemented method of the present invention for second order perspective texture mapping using linear interpolation parameters.

With reference to FIG. 3A, a block diagram is shown of a host computer system 312 used by the preferred embodiment of the present invention. In general, host computer system 312 used by the preferred embodiment of the present invention comprises a bus 300 for communicating information, a host processor 301 coupled with the bus 300 for processing information and instructions, a computer readable volatile memory unit 302 (e.g. random access memory unit) coupled with the bus 300 for storing information and instructions for the host processor 301, a computer readable non-volatile memory unit 303 (e.g., read only memory unit) coupled with the bus 300 for storing static information and instructions for the host processor 301, a computer readable data storage device 304 such as a magnetic or optical disk and disk drive (e.g., hard drive or floppy diskette) coupled with the bus 300 for storing information and instructions, and a display device 305 coupled to the bus 300 for displaying information to the computer user. The display device 305 utilized with the computer system 312 of the present invention can be a liquid crystal device, cathode ray tube, or other display device suitable for creating graphic images and alphanumeric characters recognizable to the user.

The host system 312 provides data and control signals via bus 300 to a graphics hardware unit ("card") 309. The graphics hardware card 309 contains a display processor 310 which executes a series of display instructions found within a display list. The display processor 310 supplies data and control signals to a frame buffer which refreshes the display device 305 for rendering images (including graphics images) on display device 305.

Figure 3B:
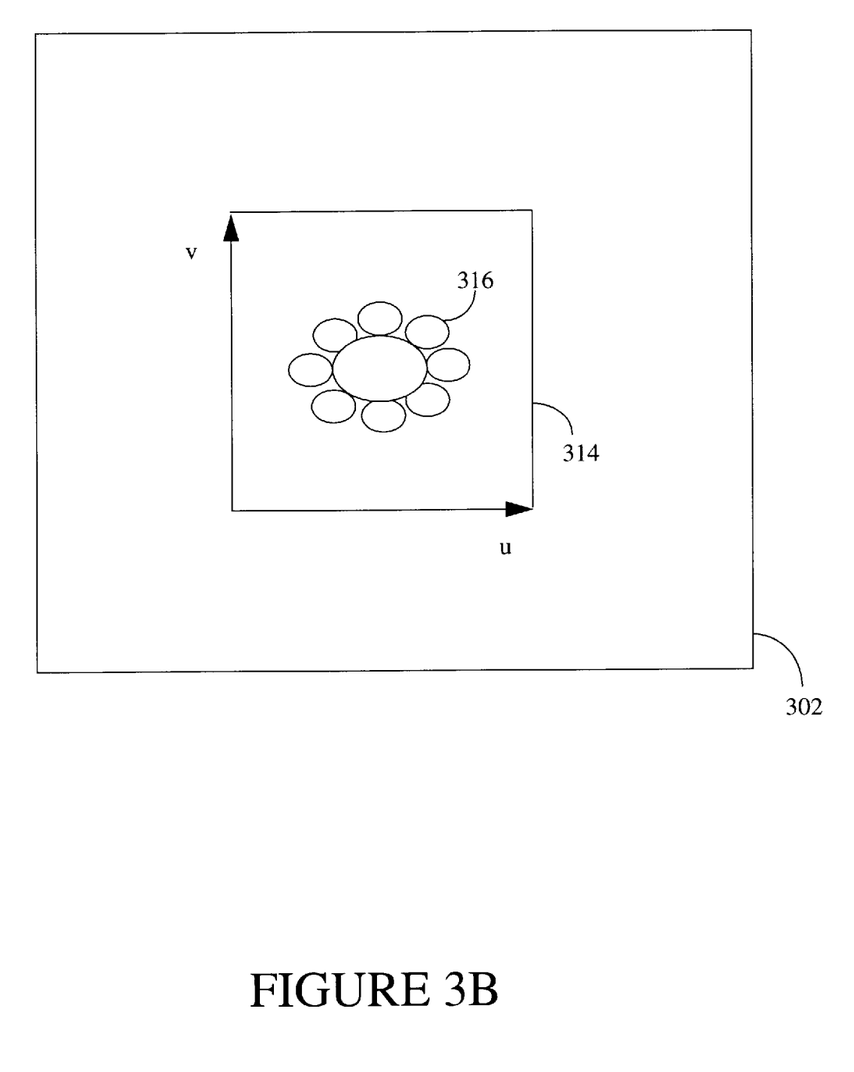
FIG. 3B represents a computer readable volatile memory unit containing a bit mapped texture map stored therein in accordance with the present invention.

With reference to FIG. 3B, a block diagram is shown of the computer readable volatile memory unit 302 containing a texture map 314 stored therein.

The present invention provides an approximation for non-homogenous 2nd order perspective texture mapping which applies color or visual attributes of texels of a (u, v) configured texture map to surfaces of 3-D graphical objects represented in 2-D (x, y) display coordinate space. Color values for display pixels in (x, y) display coordinate space are determined based on data sampled from the texture map 314 and processed according to a 2nd order perspective texture mapping process of the present invention. Texture map 314 can include bit mapped data representative of an image 316.

Figure 4:
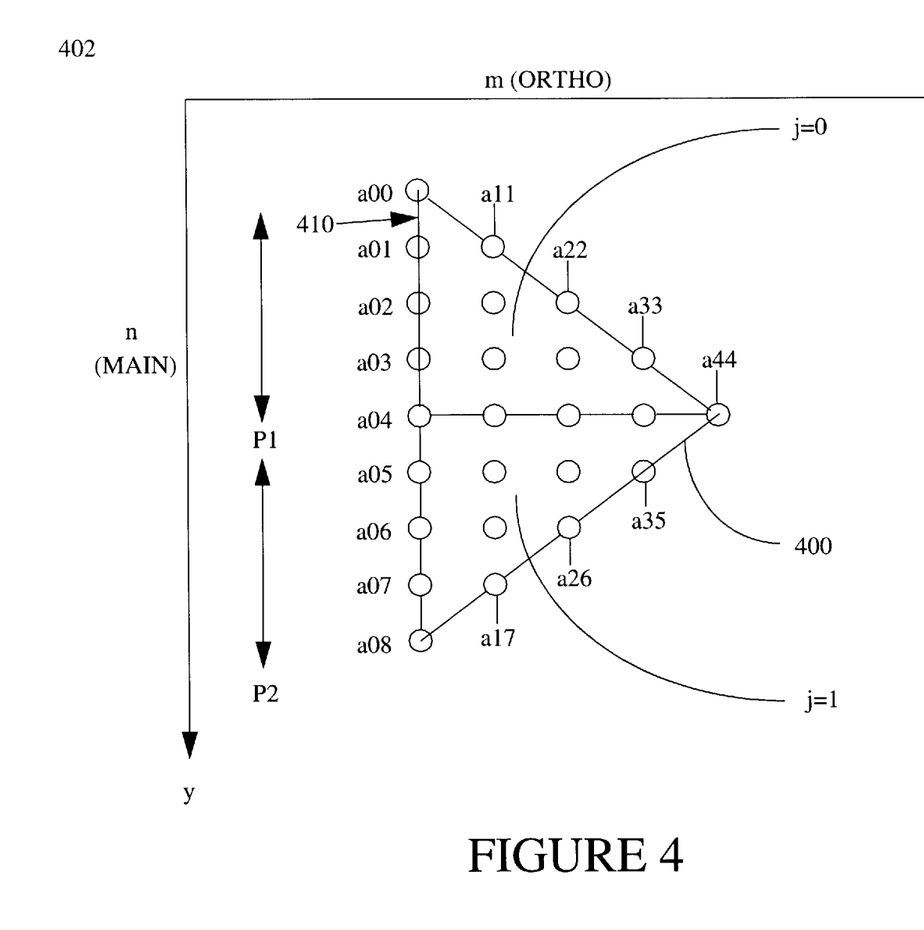
FIG. 4 is a texture polygon, comprised of polygon coordinates, $a_{m,n}$, in (m, n) texture polygon coordinate space in accordance with the present invention.

With reference to FIG. 4, an exemplary texture polygon 400 is shown in an (m, n) polygon coordinate space 402 which has an orthogonal position coordinate, m, and a main (or vertical) position coordinate, n. The texture polygon 400 is comprised of polygon coordinates, $a_{m,n}$. The texture polygon 400 can be a triangle, as shown in FIG. 4, or any other polygon. The texture polygon 400 includes an upper half region, designated by j=0, and a lower half region designated by j=1 (FIG. 4). The upper half region of the exemplary texture polygon 400 includes P1 rows (or rows) and the lower half region of texture polygon 400 includes (P2-P1) rows. The major slope 410 of the triangle 400 spans from the upper vertex to its lower vertex and while shown vertical in FIG. 4, the major slope 410 can also be diagonal.

The present invention provides a 2nd order perspective texture mapping process which determines texture coordinates, $u(a_{m,n})$ and $v(a_{m,n})$, for each of the polygon coordinates, $a_{m,n}$. Texture coordinates, $u(a_{m,n})$ and $v(a_{m,n})$, are used as indexes to access data in the texture map 314 if FIG. 3B. Texture coordinates, $u(a_{m,n})$ and $v(a_{m,n})$ determine the color of display pixels rendered in corresponding (x, y) display coordinate space of the polygon 400 on the display device 305.

Determining values for texture coordinates, $u(a_{m,n})$ and $v(a_{m,n})$, involves second order perspective texture map sampling of the texture map 314 of FIG. 3B. In the present invention, the rate of change of u with respect to x, du/dx, is referred to as $du_{ortho}$. Similarly, the rate of change of u with respect to y, du/dy, is referred to as $du_{main}$. The rate of change of v with respect to x, dv/dx, is referred to as $dv_{ortho}$. The rate of change of v with respect to y, dv/dy, is referred to as $dv_{main}$. The rate of change of the rate of change of u with respect to x, $d^2u/dx^2$, is referred to as $d^2u_{ortho}$. The rate of change of the rate of change of u with respect to y, $d^2u/dy^2$, is referred to as $d^2u_{main}$. The rate of change of the rate of change of v with respect to x, $d^2v/dx^2$, is referred to as $d^2v_{ortho}$. The rate of change of the rate of change of v with respect to y, $d^2v/dy^2$, is referred to as $d^2v_{main}$. Parameters, $du_{ortho-ADD}$ and $dv_{ortho-ADD}$, are defined as offset values and are constants.

The pixels, $a_{m,n}$ of polygon 400 are rendered on display screen 305 from the top rows (or rows) downward and for each row, from the left most pixel (e.g., $a_{0,m}$) rightward to the far right pixel. As shown below, each pixel is processed separately for rendering on display screen 305. In view of the exemplary polygon 400 of FIG. 3B, the pixels are processed in the following order: $a_{0,0}$; $a_{0,1}$; $a_{1,1}$; $a_{0,2}$; $a_{1,2}$; $a_{2,2}$; $a_{0,3}$; $a_{1,3}$; $a_{2,3}$; $a_{3,3}$; . . . $a_{0,7}$; $a_{1,7}$; and $a_{0,8}$.

PROCESS OF THE PRESENT INVENTION

Figure 5:
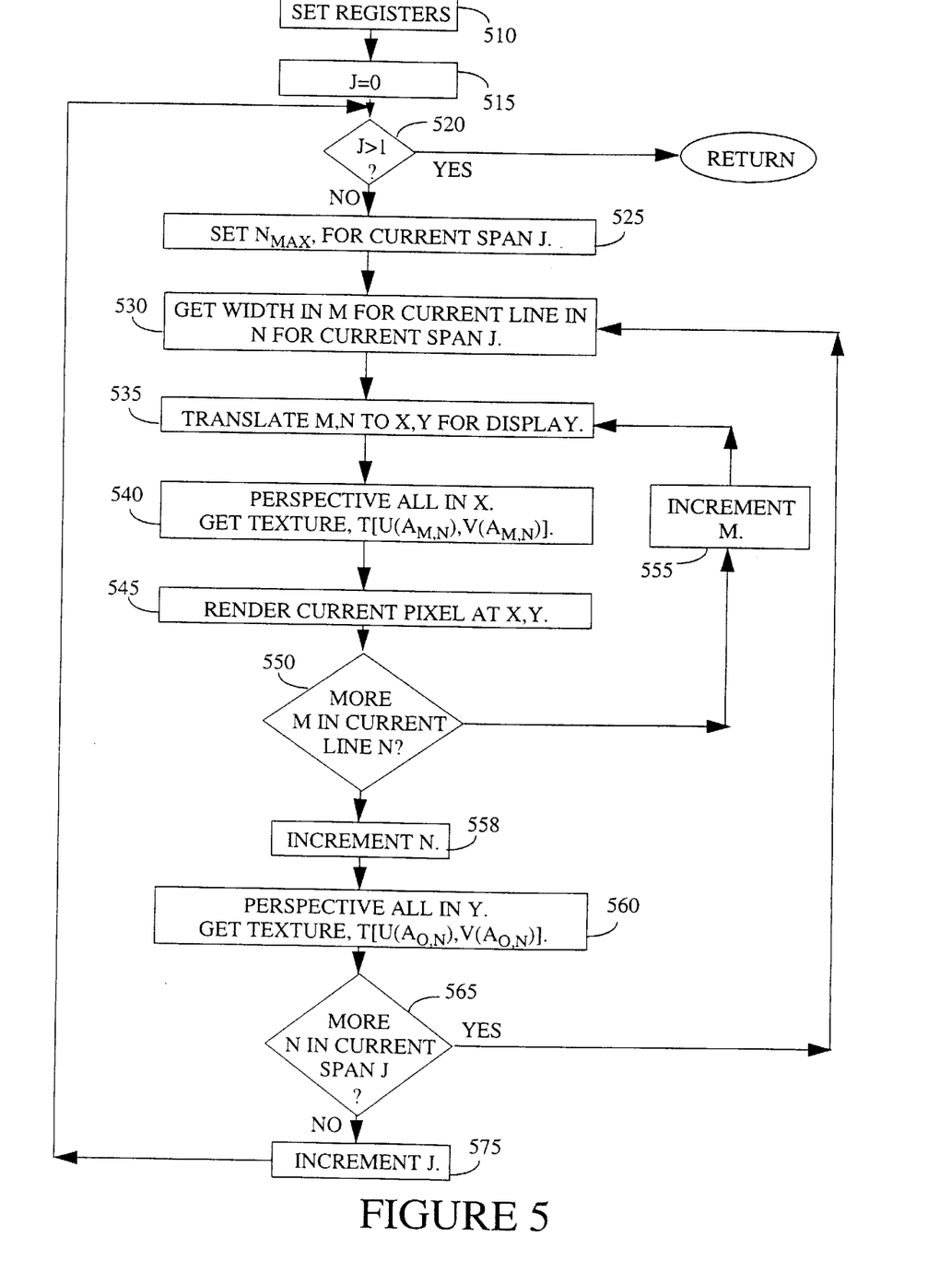
FIG. 5 is a flow diagram for implementing steps of the method of the present invention for second order perspective texture mapping using linear interpolation parameters.

FIG. 5 shows a flow diagram for implementing a process 500 according to the method of the present invention for non-homogenous second order perspective texture mapping using linear interpolation parameters. Process 500 includes polygon rendering and maps images or patterns from the (u, v) texture map 314 to a polygon in (x, y) display coordinate space on the display device 305. Texture coordinates, $u(a_{m,n})$ and $v(a_{m,n})$, are determined for each of the polygon coordinates, $a_{m,n}$, of FIG. 4. Texture coordinates, $u(a_{m,n})$ and $v(a_{m,n})$, are used to determine colors or visual attributes of display pixels rendered in (x, y) display coordinate space on the display device 305.

In operation, process 500 determines color values for pixels in (x, y) display coordinate space and then renders display pixels sequentially on the display device 305, horizontally from left to right and sequentially downward as orthogonal lines of pixels are fully rendered. It is appreciated however that the method of the present invention is also well suited to rendering pixels horizontally from right to left. The process 500 of the present invention is implemented as instructions stored in a computer readable memory unit of host computer system 312 and can be executed over the host processor 301 of FIG. 3 or over the display processor 310 of the peripheral graphics device 309 of FIG. 3A.

In step 510 of FIG. 5, values are received by process 500 for a set of parameters including $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho-ADD}$, and $dv_{ortho-ADD}$. The initial texture coordinates, $u(a_{0,0})$ and $v(a_{0,0})$, are set equal to $u$-$_{main}$ and $v$-$_{main}$ respectively. The above parameters are computed based on a process described in patent application Ser. No. 08/777,558, filed on Dec. 30, 1996, entitled Method for Computing Parameters Used in a Non-Homogeneous Second Order Perspective Texture Mapping Processing Using Interpolation, assigned to the assignee of the present invention, and having an attorney docket number of CRUS-096-0030. Also at step 510, the values of m and n are set to initial values (e.g., m=0 and n=0).

In step 515, a span value, j, is set to an initial value. In the preferred embodiment of the present invention, the upper half region of the texture polygon 400 of FIG. 4 is designated when span, j, is equal to 0 and the lower half region of the texture polygon 400 is designated when span, j, is equal to 1.

In step 520 of FIG. 5, it is determined whether j>1. The upper half region of the texture polygon 400 of FIG. 4 is processed while span, j, is equal to 0 and the lower half region of the texture polygon 400 is processed while span, j, is equal to 1. If j<=1, process 500 proceeds to step 525. If j>1, process 500 terminates.

In step 525 of FIG. 5, the total number of rows, n, is determined for the half region of texture polygon 400 designated by the current span, j (FIG. 4). Provided that j=0, the number of orthogonal lines to be processed, in the upper half region of the texture polygon 400, is equal to P1. The value, $n_{max}$, is equal to P1 at step 525. Provided that j=1, the number of orthogonal lines to be processed, in the lower half region of exemplary texture polygon 400, is equal to (P2-P1). This value, $n_{max}$, is set to (P2-P1) at step 525 for this case.

Step 530 of FIG. 5 determines the number of polygon coordinates, $a_{m,n}$, in the current row, n, of the texture polygon 400 (FIG. 4). This is the row width. For example, if n=0, then it is determined in step 530 that there is one polygon coordinate, $a_{0,0}$, in the orthogonal line defined by n=0 (FIG. 4). If n=1, then it is determined in step 530 that there are two polygon coordinates, $a_{0,1}$ and $a_{1,1}$, in the orthogonal line defined by n=0 (FIG. 4).

At step 535, the current polygon position in (m, n) polygon coordinate space is translated into a corresponding display position in (x, y) display coordinate space. Once the position of polygon coordinate space (m, n) is known with respect to the display coordinate space position (x, y), step 535 can be implemented using well known translation techniques.

In step 540 of FIG. 5, texture coordinates, $u(a_{m,n})$ and $v(a_{m,n})$, are determined for the current polygon coordinate, $a_{m,n}$, according to Relationships 2A and 2B, below:

$$u(a_{m,n}) = u(a_{m-1,n}) + du_{ortho(n)} + (m-1)d^2u_{ortho} \text{ for } m>0 \quad (2A)$$

$$v(a_{m,n}) = v(a_{m-1,n}) + dv_{ortho(n)} + (m-1)d^2v_{ortho} \text{ for } m>0; \quad (2B)$$

wherein $du_{ortho(n)}$ and $dv_{ortho(n)}$ are determined according to relationships 3A and 3B, below:

$$du_{ortho(n)} = n(du_{ortho\ ADD}) + du_{ortho} \text{ for all n;} \quad (3A)$$

$$dv_{ortho(n)} = n(dv_{ortho\ ADD}) + dv_{ortho} \text{ for all n;} \quad (3B)$$

wherein $du_{orthoADD}$, $dv_{orthoADD}$, $du_{ortho}$, and $dv_{ortho}$ are constant values. Step 540 of FIG. 5 is used to determine values for texture coordinates, $u(a_{m,n})$ and $v(a_{m,n})$, for all polygon coordinate positions along the current line, n, other than the first polygon coordinates, $a_{0,n}$, of each row, n, of the texture polygon 400 of FIG. 4. On the first pass through step 540 for a new line, n, m=0. Texture coordinates, $u(a_{0,n})$ and $v(a_{0,n})$, for the first polygon coordinate positions, $a_{0,n}$, of each row, n, of the texture polygon 400 of FIG. 4, are determined according to steps described below with respect to step 560.

At step 545, texture coordinates, $u(a_{m,n})$ and $v(a_{m,n})$, are used to define a color for a display pixel in (x, y) display coordinate space. The color or texture defined by texture coordinates, $u(a_{m,n})$ and $v(a_{m,n})$, can be expressed by Relationship (4), below:

$$\text{Color} = T[u(a_{m,n}) \text{ and } v(a_{m,n})] \quad (4)$$

wherein T[u, v] refers to the color or texture at the (u,v) texture coordinates of the texture map 314.

Step 545 of FIG. 5 obtains the color value, color, and renders a display pixel on the display device 305 wherein the pixel color or texture is defined by texture coordinates, $u(a_{m,n})$ and $v(a_{m,n})$ for the current polygon coordinate, $a_{m,n}$. The display pixel rendered on the display device 305 by step 545 is positioned at the (x, y) display coordinate position, corresponding to the current polygon coordinate, $a_{m,n}$, defined in step 535 above. The color of the display pixel rendered on display device 305 in step 545 is determined according to Relationship (4) above.

Step 550 of FIG. 5 determines whether there are more polygon coordinates, $a_{m,n}$, to be processed for the current row, n, of texture polygon 400 by comparing n to the current row width obtained at step 530. If there are more polygon coordinates, $a_{m,n}$, for the current row, n, of the texture polygon 400, then process 500 proceeds to step 555, which increments the value of m by one. From step 555, process 500 proceeds back to step 535 to set an (x, y) display coordinate corresponding to the new current polygon coordinate, $a_{m,n}$. At step 535, the polygon position in (m, n) polygon coordinate space is translated into a corresponding (x, y) display coordinate space. In this manner all pixels from m>0 of the given row, n, are rendered on the display device 305. At step 550, if the current value of m equals the width in m defined for the current row, then no more coordinates in $a_{m,n}$ are in the current row, n. At step 550, if there are no more polygon coordinates, $a_{m,n}$, to be processed for the current row, n, of the texture polygon 400, then process 500 proceeds to step 558.

In step 558, the value of n is incremented to access a new polygon row and process 500 proceeds to process the next row, n, of texture polygon coordinates, $a_{m,n}$, of the texture polygon 400 of FIG. 4. From step 558, process 500 proceeds to step 560

Step 560 of FIG. 5 determines values for texture coordinates, $u(a_{0,n})$ and $v(a_{0,n})$, for the current polygon coordinate, $a_{0,n}$ (except for $a_{0,0}$ for which an initial value is assumed in step 510 above). Each of the polygon coordinates, $a_{0,n}$ is the first polygon coordinate in the current row, n, of the texture polygon 400 (FIG. 4). Values for $u(a_{0,n})$ and $v(a_{0,n})$ are determined for the current polygon coordinate, $a_{0,n}$, by implementing Relationships (5A) and (5B), below;

$$u(a_{0,n}) = u(a_{0,n-1}) + du_{main} + (n-1)d^2u_{main} \text{ for } m=0, n>0 \quad (5A)$$

$$v(a_{0,n}) = v(a_{0,n-1}) + dv_{main} + (n-1)d^2v_{main} \text{ for } m=0, n>0; \quad (5B)$$

wherein $du_{main}$, $d^2u_{main}$, $dv_{main}$, and $d^2v_{main}$ are constants.

Step 565 determines whether there are more rows, n, of polygon coordinates, $a_{m,n}$, to be processed for the current span, j, of the texture polygon 400 of FIG. 4. This is performed by comparing the current count, n, to the current value of $n_{max}$. If $n > n_{max}$, then there are no more rows in the current span to process. If rows remain, then process 500 proceeds back to step 530 and again through steps 530–565 to process the next line, n, of polygon coordinates, $a_{m,n}$, in the texture polygon 400. If there are no more rows, n, of polygon coordinates, $a_{m,n}$, to be processed for the current span, j, of the texture polygon 400, then process 500 proceeds to step 575 which increments the value of span, j, by 1. From step 575, process 500 proceeds back to step 520 which determines whether j>1. If j<=1, process 500 proceeds to step 525 to process polygon coordinates, $a_{m,n}$, for the next span of texture polygon 400. If j>1, process 500 terminates.

By receiving the initial values and constants in step 510 and using the above relationships of step 540 and step 560, the present invention provides an effective polygon texture method 500 that eliminates the processor intensive divide operation used by prior art systems. In lieu of the expensive divide, the present invention utilizes a linear interpolation driven technique based on a set of interpolation parameters received at step 510.

What is claimed is:

1. In a computer system having a host processor, a bus coupled to said processor, a display screen coupled to said bus, and a memory coupled to said bus, a method of performing non-homogenous 2nd order perspective texture mapping onto a polygon having pixel coordinates arranged in (m,n) coordinate space, said method comprising the computer implemented steps of:

(a) receiving constant parameters $u\text{-}_{main}$, $v\text{-}_{main}$, $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho\text{-}ADD}$, and $dv_{ortho\text{-}ADD}$, wherein initial values for texture coordinates, $u(a_{0,0})$ and $v(a_{0,0})$, are equal to $u\text{-}_{main}$ and $v\text{-}_{main}$ respectively;

(b) determining values for texture coordinates, $u(a_{0,n})$ and $v(a_{0,n})$, which correspond to the first polygon coordinate on each row, n, of said texture polygon, by implementing, $$u(a_{0,n}) = u(a_{0,n-1}) + du_{main} + (n-1)d^2u_{main} \text{ for } m=0, n>0, \text{ and}$$

$$v(a_{0,n}) = v(a_{0,n-1}) + dv_{main} + (n-1)d^2v_{main} \text{ for } m=0, n>0; \text{ and}$$

(c) determining values for texture coordinates, $u(a_{m,n})$ and $v(a_{m,n})$, which correspond to each polygon coordinate, $a_{m,n}$, for each polygon coordinate position, m, other than the first polygon coordinate position on each row, n, of said texture polygon, by implementing, $$u(a_{m,n})=u(a_{m-1,n})+du_{ortho(n)}+(m-1)d^2u_{ortho} \text{ for } m>0, \text{ and}$$

$$v(a_{m,n})=v(a_{m-1,n})+dv_{ortho(n)}+(m-1)d^2v_{ortho} \text{ for } m>0;$$

wherein $du_{ortho(n)}$ and $dv_{ortho(n)}$ are determined according to, $$du_{ortho(n)}=n(du_{ortho\ ADD})+du_{ortho} \text{ for all n, and}$$

$$dv_{ortho(n)}=n(dv_{ortho\ ADD})+dv_{ortho} \text{ for all n.}$$

2. A method as described in claim 1 further comprising the computer implemented steps of:
- (d) accessing a texture value from a texture map stored in said memory for each set of texture coordinates, $u(a_{m,n})$ and $v(a_{m,n})$; and
- (e) rendering each texture value obtained in step (d) on said display screen at a corresponding (x, y) position.

3. A method as described in claim 1 further comprising the computer implemented steps of:
- setting a span value, j, to designate a span region of said polygon;
- determining the total number of rows, n, for said span region, j, of said polygon;
- determining the number of polygon coordinates, $a_{m,n}$, in each row, n, of said polygon;
- translating each of said polygon coordinates, $a_{m,n}$, into corresponding (x, y) display coordinates;
- accessing a stored texture map by each set of texture coordinates, $u(a_{m,n})$, $v(a_{m,n})$, to obtain texture values; and
- rendering each texture value on said display screen at corresponding (x, y) display coordinates.

4. In a computer system having a host processor, a bus coupled to said processor, a display screen coupled to said bus, and a memory coupled to said bus, a method of performing 2nd order perspective texture mapping onto a polygon having pixel coordinates arranged in (m,n) coordinate space, said method comprising the computer implemented steps of:
- (a) receiving constant parameters $u_{main}$, $v_{main}$, $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho\text{-}ADD}$, and $dv_{ortho\text{-}ADD}$, wherein initial values for texture coordinates, $u(a_{0,0})$ and $v(a_{0,0})$, are equal to $u_{main}$ and $v_{main}$ respectively;
- (b) determining values for texture coordinates, $u(a_{0,n})$ and $v(a_{0,n})$, which correspond to the first polygon coordinate on each row, n, of said texture polygon, by implementing, $$u(a_{0,n})=u(a_{0,n-1})+du_{main}+(n-1)d^2u_{main} \text{ for } m=0, n>0, \text{ and}$$

$$v(a_{0,n})=v(a_{0,n-1})+dv_{main}+(n-1)d^2v_{main} \text{ for } m=0, n>0; \text{ and}$$

- (c) determining values for texture coordinates, $u(a_{m,n})$ and $v(a_{m,n})$, which correspond to each polygon coordinate, $a_{m,n}$, for each polygon coordinate position, m, other than the first polygon coordinate position on each row, n, of said texture polygon, by implementing, $$u(a_{m,n})=u(a_{m-1,n})+du_{ortho(n)}+(m-1)d^2u_{ortho} \text{ for } m>0, \text{ and}$$

$$v(a_{m,n})=v(a_{m-1,n})+dv_{ortho(n)}+(m-1)d^2v_{ortho} \text{ for } m>0.$$

5. A method as described in claim 4 further comprising the steps of:
- (d) accessing a texture value from a texture map stored in said memory for each set of texture coordinates, $u(a_{m,n})$ and $v(a_{m,n})$; and
- (e) rendering each texture value obtained in step (d) on said display screen at a corresponding (x, y) position.

6. A method as described in claim 4 further comprising the computer implemented steps of:
- setting a span value, j, to designate a span region of said polygon;
- determining the total number of rows, n, for said span region, j, of said polygon;
- determining the number of polygon coordinates, $a_{m,n}$, in each row, n, of said polygon;
- translating each of said polygon coordinates, $a_{m,n}$, into corresponding (x, y) display coordinates;
- accessing a stored texture map by each set of texture coordinates, $u(a_{m,n})$, $v(a_{m,n})$, to obtain texture values; and
- rendering each texture value on said display screen at corresponding (x, y) display coordinates.

7. A computer system comprising a host processor coupled to a bus, physical memory coupled to said bus, and a display screen, said physical memory containing program code that when executed over said host processor causes said computer system to implement a method of performing non-homogenous 2nd order perspective texture mapping onto a polygon having pixel coordinates arranged in (m,n) coordinate space, said method comprising the computer implemented steps of:
- (a) receiving constant parameters $u_{main}$, $v_{main}$, $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho\text{-}ADD}$, and $dv_{ortho\text{-}ADD}$, wherein initial values for texture coordinates, $u(a_{0,0})$ and $v(a_{0,0})$, are equal to $u_{main}$ and $v_{main}$ respectively;
- (b) determining values for texture coordinates, $u(a_{0,n})$ and $v(a_{0,n})$, which correspond to the first polygon coordinate on each row, n, of said texture polygon, by implementing, $$u(a_{0,n})=u(a_{0,n-1})+du_{main}+(n-1)d^2u_{main} \text{ for } m=0, n>0, \text{ and}$$

$$v(a_{0,n})=v(a_{0,n-1})+dv_{main}+(n-1)d^2v_{main} \text{ for } m=0, n>0; \text{ and}$$

- (c) determining values for texture coordinates, $u(a_{m,n})$ and $v(a_{m,n})$, which correspond to each polygon coordinate, $a_{m,n}$, for each polygon coordinate position, m, other than the first polygon coordinate position on each row, n, of said texture polygon, by implementing, $$u(a_{m,n})=u(a_{m-1,n})+du_{ortho(n)}+(m-1)d^2u_{ortho} \text{ for } m>0, \text{ and}$$

$$v(a_{m,n})=v(a_{m-1,n})+dv_{ortho(n)}+(m-1)d^2v_{ortho} \text{ for } m>0;$$

wherein $du_{ortho(n)}$ and $dv_{ortho(n)}$ are determined according to, $$du_{ortho(n)}=n(du_{ortho\ ADD})+du_{ortho} \text{ for all n, and}$$

$$dv_{ortho(n)}=n(dv_{ortho\ ADD})+dv_{ortho} \text{ for all n.}$$

8. A computer system as described in claim 7 wherein said method further comprises the computer implemented steps of:
- (d) accessing a texture value from a texture map stored in said memory for each set of texture coordinates, $u(a_{m,n})$ and $v(a_{m,n})$; and
- (e) rendering each texture value obtained in step (d) on said display screen at a corresponding (x, y) position.

9. A computer system as described in claim 7 wherein said method further comprises the computer implemented steps of:

setting a span value, j, to designate a span region of said polygon;

determining the total number of rows, n, for said span region, j, of said polygon;

determining the number of polygon coordinates, $a_{m,n}$, in each row, n, of said polygon;

translating each of said polygon coordinates, $a_{m,n}$, into corresponding (x, y) display coordinates;

accessing a stored texture map by each set of texture coordinates, $u(a_{m,n})$, $v(a_{m,n})$, to obtain texture values; and rendering each texture value on said display screen at corresponding (x, y) display coordinates.

10. In a computer system having a host processor, a bus coupled to said processor, a display screen coupled to said bus, and a memory coupled to said bus, a method for performing second order perspective texture mapping onto a polygon having pixel coordinates arranged in (m,n) coordinate space, said method comprising the computer implemented steps of:

(a) receiving a set of parameters including $u_{main}$, $V_{main}$, $dv_{ortho}$, $dv_{main}$, $du_{ortho}$, $du_{main}$, $d^2u_{ortho}$, $d^2u_{main}$, $d^2v_{ortho}$, $d^2v_{main}$, $du_{ortho-ADD}$, and $dv_{ortho-ADD}$, wherein initial values for texture coordinates, $u(a_{0,0})$ and $v(a_{0,0})$, are equal to $u_{main}$ and $v_{main}$ respectively;

(b) for each row, n>0, of said polygon, determining values for texture coordinates, $u(a_{0,n})$ and $v(a_{0,n})$, which correspond to the first polygon coordinate on each row, n, of said polygon, said step (b) performed according to the below procedures:

$$u(a_{0,n})=u(a_{0, n-1})+du_{main}+(n-1)d^2u_{main},$$

$$v(a_{0,n})=v(a_{0, n-1})+dv_{main}+(n-1)d^2v_{main};$$

(c) for each row, n>0, determining values for texture coordinates, $u(a_{m,n})$ and $v(a_{m,n})$, for each polygon coordinate, $a_{m,n}$, m>0, of said texture polygon, said step (c) performed according to the below procedures:

$$u(a_{m,n})=u(a_{m-1, n})+du_{ortho(n)}+(m-1)d^2u_{ortho},$$

$$v(a_{m,n})=v(a_{m-1, n})+dv_{ortho(n)}+(m-1)d^2v_{ortho};\text{ and}$$

(d) determining values of $du_{ortho(n)}$ and $dv_{ortho(n)}$ for each orthogonal line.

11. A method as described in claim 10 wherein said step (d) is performed according to the below procedures:

$$du_{ortho(n)}=n(du_{ortho\ ADD})+du_{ortho},\text{ and}$$

$$dv_{ortho(n)}=n(dv_{ortho\ ADD})+dv_{ortho}.$$

12. A method as described in claim 11 and further comprising the steps of:

(e) accessing a texture value from a texture map stored in said memory for each set of texture coordinates, $u(a_{m,n})$ and $v(a_{m,n})$, said texture map containing an image for display on said display screen with second order perspective; and (f) rendering each texture value obtained in step (e) on said display screen at an (x, y) screen display coordinate corresponding to an (m,n) polygon coordinate of said each texture value.

13. A method as described in claim 11 further comprising the steps of:

setting a span value, j, to designate a span region of said texture polygon;

determining the total number of rows, n, for said span region of said polygon;

determining the number of polygon coordinates, $a_{m,n}$, in each row, n, of said polygon;

translating each of said polygon coordinates, $a_{m,n}$, into corresponding (x, y) display coordinates;

accessing a stored texture map by each set of texture coordinates $u(a_{m,n})$ and $v(a_{m,n})$ to obtain texture values;

rendering on said display screen each texture value obtained from said step of accessing a corresponding (x,y) display coordinate.

* * * * *